(12) United States Patent
Chang

(10) Patent No.: US 6,168,542 B1
(45) Date of Patent: Jan. 2, 2001

(54) CROWD ROPE TAKE-UP SYSTEM FOR MINING SHOVEL

(75) Inventor: Shyue-Sheng Chang, Muskego, WI (US)

(73) Assignee: Bucyrus International, Inc., South Milwaukee, WI (US)

( * ) Notice: Under 35 U.S.C. 154(b), the term of this patent shall be extended for 0 days.

(21) Appl. No.: 09/249,186

(22) Filed: Feb. 12, 1999

(51) Int. Cl.$^7$ .................................................. F16H 7/12
(52) U.S. Cl. .......................... 474/136; 37/397; 414/693
(58) Field of Search ......................... 414/693; 474/136; 37/397, 396; 212/250, 274

(56) References Cited

U.S. PATENT DOCUMENTS

| | | | |
|---|---|---|---|
| 106,248 | * | 8/1870 | Bechtel ........................ 474/136 X |
| 1,464,411 | * | 8/1923 | Genova .......................... 474/136 |
| 2,472,461 | * | 6/1949 | Blackburn ....................... 474/136 |
| 3,481,489 | | 12/1969 | Stauffer ........................ 212/55 |
| 3,608,755 | | 9/1971 | Solokhin et al. . | |
| 3,843,095 | * | 10/1974 | Rupert .......................... 37/396 X |
| 3,933,260 | | 1/1976 | Kronlokken et al. . | |
| 5,259,821 | * | 11/1993 | Bryant ........................... 474/136 |

FOREIGN PATENT DOCUMENTS

| | | |
|---|---|---|
| 1463269 | 3/1967 | (FR) . |
| 2161244 | 7/1973 | (FR) . |
| 491191 | 1/1938 | (GB) . |
| 1170170 | 11/1969 | (GB) . |

* cited by examiner

*Primary Examiner*—Donald W. Underwood
(74) *Attorney, Agent, or Firm*—Quarles & Brady LLP

(57) ABSTRACT

A crowd rope take-up mechanism is mounted on the end of a shovel handle remote from the dipper bracket. The mechanism includes a cylinder with external screw threads engaged by a nut wheel. The cylinder mounts a sheave that received a loop of the crowd rope. A worm gear engages gear teeth on the outside of the nut wheel. The cylinder is restrained against rotation and the nut wheel is captured longitudinally so that rotation of the worm gear by a power wrench is translated into longitudinal movement of the cylinder and sheave. The worm gear is locked against rotation by a removable plug.

6 Claims, 3 Drawing Sheets

CROWD ROPE TAKE-UP SYSTEM FOR MINING SHOVEL

BACKGROUND OF THE INVENTION

This invention relates to mining shovels, and in particular to an improved system for adjusting the length of a crowd rope on a mining shovel.

Mining shovels use a dipper bucket mounted on the end of a handle which is supported on a boom. A crowd system is used to power and position the dipper through its cycle of digging and dumping a load. The crowd system will either push or "crowd" the dipper and handle out away from the supporting boom or will "retract" the dipper and handle back toward the boom.

A steel rope system is often used to accomplish the crowd and retract motion of the shovel handle. The steel rope system is often a continuous loop system. The continuous loop system must be tightened at the time of initial installation as well as after a period of shovel operation since the crowd and retract ropes will be stretched by the large working loads to which they are subjected. Such a rope adjustment is required whenever the rope system has excessive slack. Typically, the rope adjustment may be required about once a week.

One existing take-up system for adjusting the length of the rope is located at the front end of the shovel handle behind the dipper. This current system utilizes a hydraulic jack and steel plate shims for adjusting and locking the ropes. When this rope system needs to be adjusted, the handle is extended until the dipper is set on the ground. Even with the dipper resting on the ground, the rope take-up system can be about 20 feet above the ground in large modern electric mining shovels. Workers need to climb to that height to perform the work and need to move the heavy shims, weighing 30 to 60 pounds each, this awkward elevated position. Also, the current position of the crowed rope take-up mechanism near the dipper means that the heavy weight of the mechanism detracts from the allowable pay load that can be carried in the dipper.

SUMMARY OF THE INVENTION

It is an object of the present invention to provide a crowd rope take-up mechanism which is readily accessible to workers for physical adjustment and which is positioned on the handle away from the dipper to increase the allowable pay load in the dipper.

It is a further object of the invention to provide a crowd rope take-up system having simplified means for adjustment.

In accordance with the invention, the crowd rope take-up system is located at the end of the handle remote from the dipper. A loop of the crowd rope extends about a sheave that is mounted on a member that can move parallel to the longitudinal axis of the handle. Means are provided to extend and retract the member relative to the handle to adjust the position of the sheave and thereby adjust the length of the rope. Preferably, the member is a cylinder having external screw threads engaged by a nut wheel. The nut wheel has external gear teeth engaged by a worm gear. The cylinder is held against rotation and the nut wheel is restrained longitudinally so that turning the worm gear advances or retracts the cylinder and its sheave.

The worm gear has a square notch at one end to receive a power wrench. The square notch is also used to receive a retainer plug that locks the worm gear against accidental rotation and thereby locks the crowd rope into an adjusted position.

The exterior of the cylinder and its screw threads can be covered by a bellows extending along the cylinder.

The foregoing and other objects and advantages of the invention will appear in the detailed description which follows. In the description, references are made to the accompanying drawings which illustrate a preferred embodiment of the invention.

DETAILED DESCRIPTION OF THE PREFERRED EMBODIMENT

Figure 1:
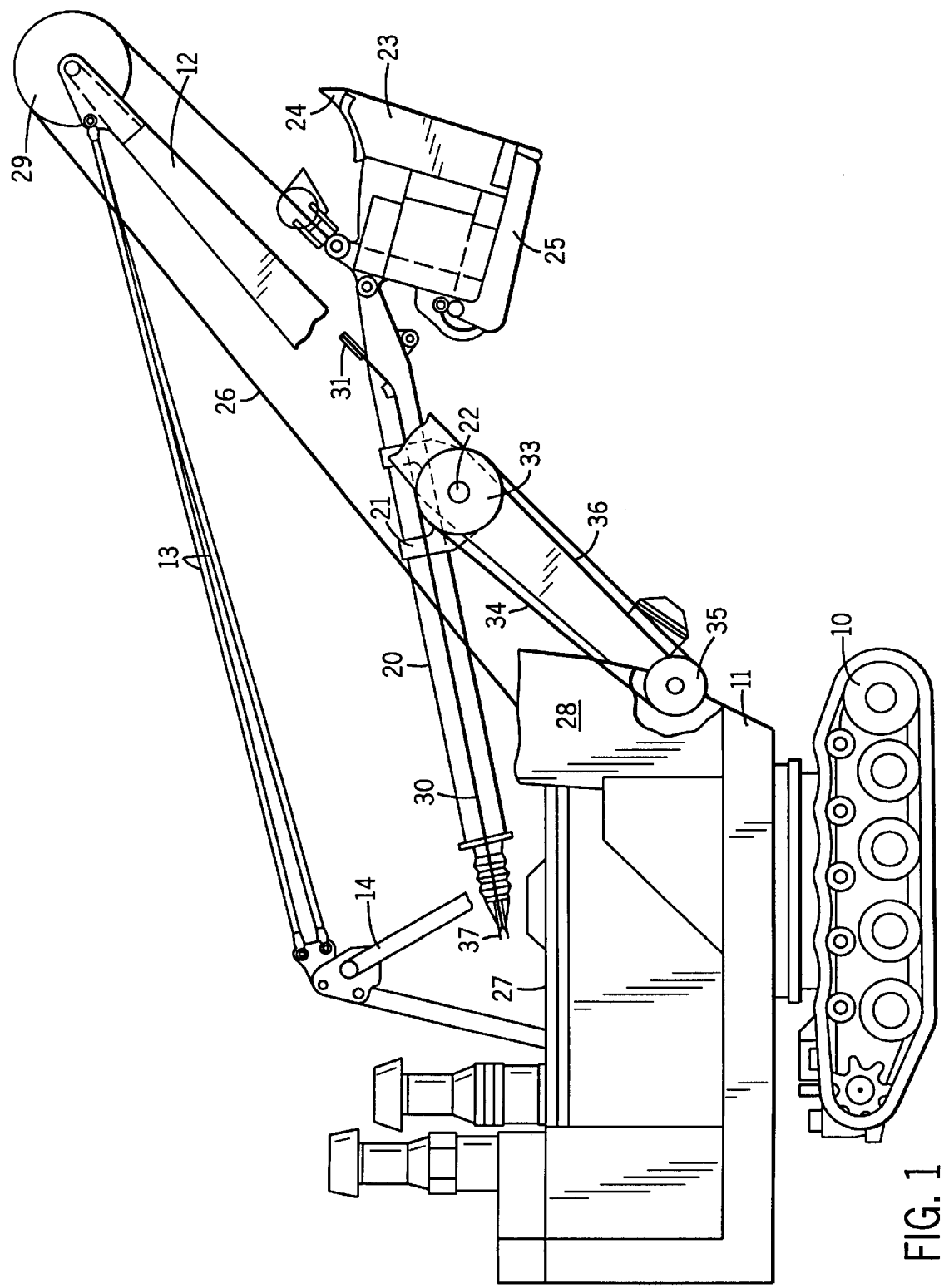
FIG. 1 is a view in elevation of an electric mining shovel including the rope take-up mechanism of the present invention.

Referring to the drawings, a mining shovel has a crawler tractor base 10 upon which an upper works II is mounted for rotation in a horizontal plane. A boom 12 extends from the front of the upper works II and is supported by boom cables 13 anchored to the top of an A-frame 14. A handle 20, is mounted in a yoke 21 called a shipper which is pivoted on the boom 12 at a shipper shaft 22. A dipper 23 having teeth 24 at one end and a swingable door 25 at the other end is mounted on the front end of the handle 20. A dipper rope 26 extends around a boom point sheave 29 at the end of the boom 12 to support the dipper 23. The upper works 11 mounts the motor and generator and other driving equipment contained in a housing 27. A forward operator's cab 28 is also mounted on the upper works 11.

Figure 2:
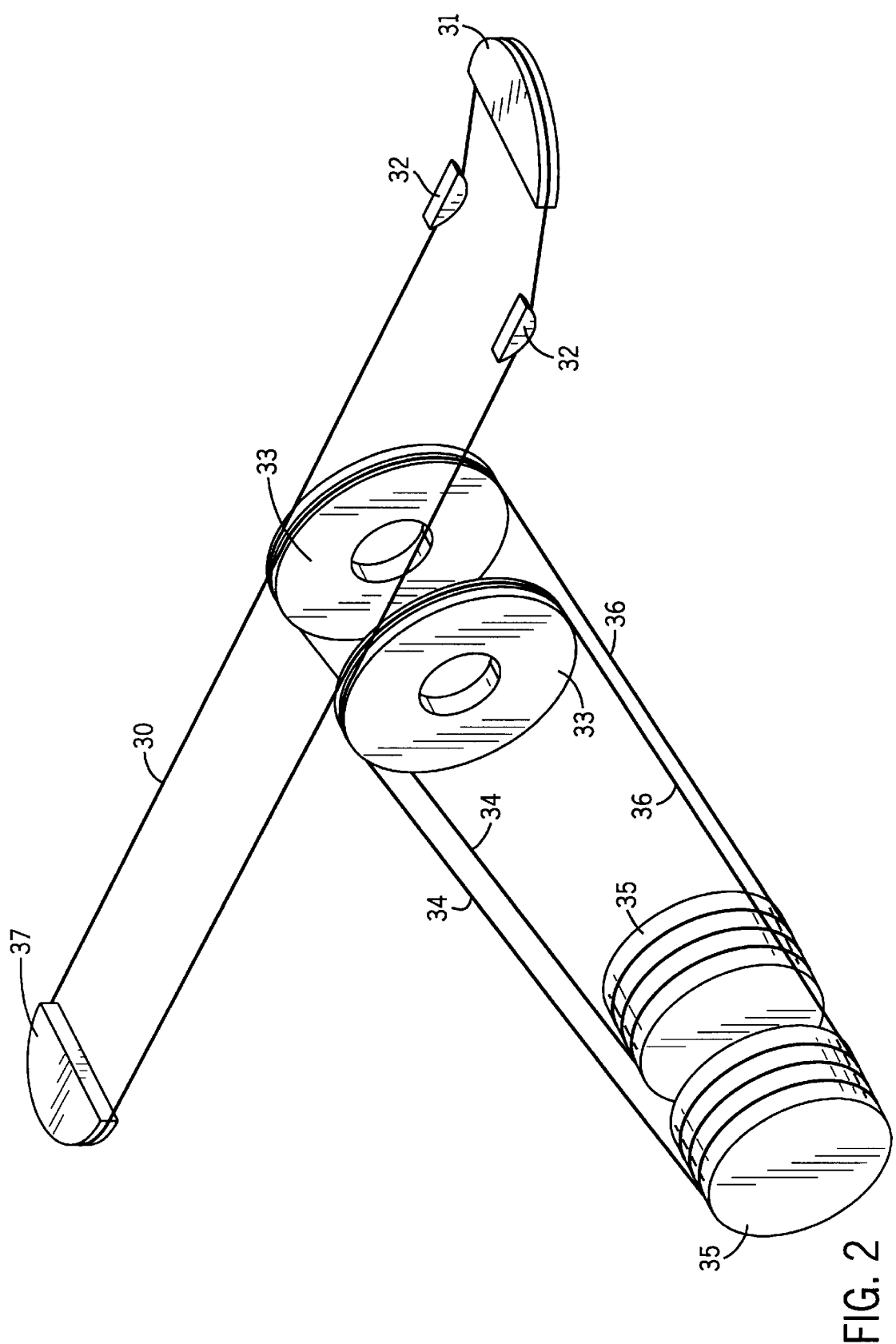
FIG. 2 is a stylized view in perspective of the arrangement of the continuous loop crowd rope.
Figure 3:
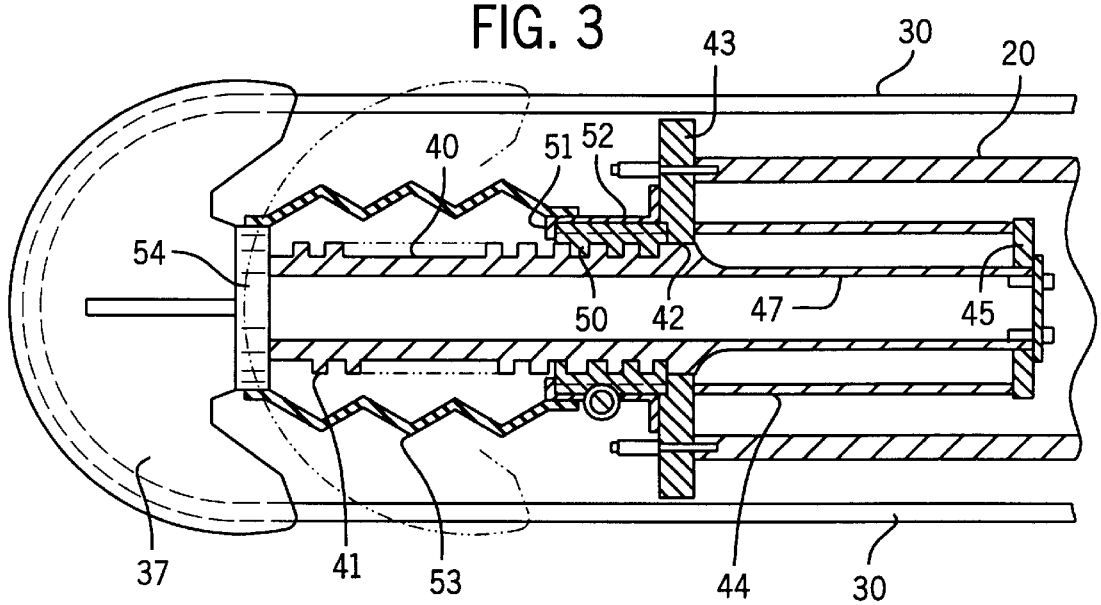
FIG. 3 is a view in horizontal section of the take-up mechanism with the worm gear rotated 90 degrees for purposes of illustration.
Figure 4:
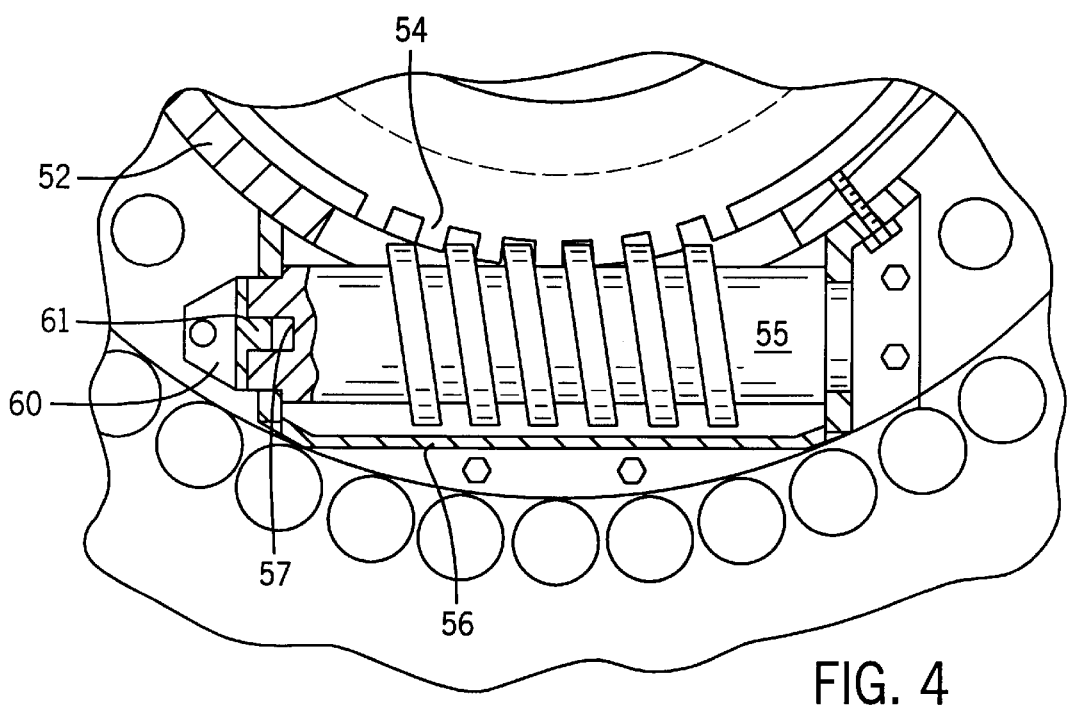
FIG. 4 is an enlarged view in elevation of the worm gear mechanism.

A loop of steel rope 30 is driven to crowd the handle 20 and the dipper 23 mounted thereon, and a second loop of steel rope 34 is driven to retract the handle 20 and dipper 23. The arrangement of the reeving for the crowd rope 30 and retract rope 34 is shown in FIG. 2. Lengths of the retract rope 34 extend from either side of a forward sheave 31 below guides 32 and around shipper sheaves 33 to drums 35. The shipper sheaves 33 are rotatably mounted on the shipper shaft 22 on the boom 12. Runs 36 of the crowd rope 30 extend from the drums 35 over the shipper sheaves 33 and then rearwardly to a rear sheave 37. In a known manner, the drums 35 are driven in a clockwise direction (as viewed in FIGS. 1 and 2) to advance, or crowd, the front of the handle and the dipper and are rotated in a counter-clockwise direction to retract the front of the handle and dipper.

In accordance with the invention, the rear sheave 37 is mounted on the end of a first cylinder 40 having external screw threads 41 along a forward circular cylindrical portion. The cylinder 40 extends through an opening 42 in a wall 43 at the handle 20. A guide cylinder 44 has a guide 45 mounted at its end and extends from the wall 43 inside the handle 20. The guide 45 has a square opening and a rear portion 47 of the first cylinder 40 has a matching square cross section.

A nut wheel 50 has internal screw threads that mate with the screw threads 41 of the cylinder 40. The nut wheel 50 is captured between the wall 43 and a flange 51 on a bracket 52 extending from the wall 43. A bellows 53 extends from the bracket 52 to the rear end 54 of the first cylinder 40.

The nut wheel 50 has external gear teeth 54 which are engaged by a worm gear 55 mounted in a housing 56 attached to the bracket 52 and extending through an opening in the bracket 52. The worm gear 55 has a square recess 57 in one end. The recess 57 is engagable by a power wrench to rotate the worm gear 55. Rotation of the worm gear 55 is translated into rotation of the nut wheel 50. Since the nut wheel 50 is longitudinally captured, rotation of the nut wheel 50 causes the cylinder 40 to move in or out relative to the wall 43 and handle 20 thereby extending or retracting the position of the rear sheave 37 to adjust the length of the rope 30. The square portion 47 of the cylinder 40 extending through the guide 45 ensures that the cylinder 40 will not be rotated by the nut wheel 50 but will be moved longitudinally.

Once the worm gear 55 has been rotated in an amount sufficient to adjust the length of the rope 30, the worm gear 55 can be held in that adjusted position by a retainer plug 60. The plug 60 has a square projection 61 received in the recess 57 in the worm gear. The retainer plug 60 is screwed or bolted to the wall 43.

Because the rope take-up mechanism is located at the rear of the handle 20, it can be readily reached by a worker standing on the flat top of the housing 27. The position of the handle and the take-up mechanism can be adjusted to place it at an optimal location relative to the top of the housing 27. Since crowd rope adjustment is accomplished using a power wrench alone, there is no need for heavy shims to be moved and located. Because the weight of the rope take-up mechanism has been moved to the rear of the handle 20, there is less weight at the front of the handle and the allowable pay load for the dipper 23 is increased.

I claim:

1. A mechanism for adjusting the length of a continuous loop crowd rope for extending and retracting a handle supported on a boom and carrying a dipper, comprising:

a cylinder slidably mountable at the rear end of the handle remote from the dipper, and having external screw threads;

a sheave mounted on the end of the cylinder and engageable with a loop of the crowd rope;

a nut wheel rotatable mounted to said cylinder, and having internal screw threads meshing with the screw threads of the cylinder and having external gear teeth; and a worm gear engaging the teeth of the nut wheel to rotate the nut wheel and thereby adjust the position of the sheave to take up slack in the crowd rope.

2. The mechanism of claim 1 wherein the cylinder extends through a wall mountable at the rear end of the handle remote from the dipper, and has a non-circular cross section adjacent an end remote from the sheave, and a guide cylinder extends from the wall and has an opening that receives and matches the non-circular cross section.

3. The mechanism of claim 1 wherein the nut wheel is captured longitudinally between wall mountable at the rear end of the handle remote from the dipper and a flange of a bracket extending from the wall.

4. The mechanism of claim 1 together with a bellows extending along the length of the cylinder and spaced from the cylinder.

5. The mechanism of claim 1 wherein the worm gear has a wrench engaging portion at one end, together with a removable member connectable between the wrench engaging portion and a wall mountable at the rear end of the handle remote from the dipper to lock the worm gear against rotation.

6. The mechanism of claim 5 wherein the wrench engaging portion is a square hole and the removable member including a square plug that mates with the hole.

* * * * *

UNITED STATES PATENT AND TRADEMARK OFFICE
CERTIFICATE OF CORRECTION

PATENT NO. : 6,168,542
DATED : January 2, 2001
INVENTOR(S) : Shyue-Sheng Chang

It is certified that error appears in the above-identified patent and that said Letters Patent is hereby corrected as shown below:

column 1, line 35, after "pounds", change [each, this] to each, in this.

column 2, line 26, after "works", replace [II] with 11.

column 2, line 28, after "works", replace [II] with 11.

claim 3, line 1, after "longitudinally", change [between wall] to between a wall.

Signed and Sealed this

Twenty-ninth Day of May, 2001

Attest:

NICHOLAS P. GODICI

Attesting Officer

Acting Director of the United States Patent and Trademark Office